United States Patent
Zeiter et al.

(10) Patent No.: US 6,699,566 B2
(45) Date of Patent: *Mar. 2, 2004

(54) PROCESS FOR MANUFACTURING SHAPED FORMS OF PACKAGING

(75) Inventors: Patrik Zeiter, Bülach (CH); Heinz Oster, Bülach (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/179,813

(22) Filed: Oct. 27, 1998

(65) Prior Publication Data

US 2003/0003250 A1 Jan. 2, 2003

Related U.S. Application Data

(62) Division of application No. 08/755,215, filed on Nov. 22, 1996, now Pat. No. 5,879,612.

(30) Foreign Application Priority Data

Dec. 12, 1995 (CH) ............................................. 3502/95
Apr. 24, 1996 (CH) ............................................. 1040/96

(51) Int. Cl.$^7$ ........................ B32B 15/08; B32B 27/30; B32B 27/32; B32B 27/34; B65D 85/42
(52) U.S. Cl. ........................ 428/166; 428/216; 428/457; 428/458; 428/461; 428/463; 428/476.9; 428/910; 206/531; 206/532
(58) Field of Search ............................... 428/457, 458, 428/216, 461, 463, 476.9, 910, 166, 332; 206/531, 532

(56) References Cited

U.S. PATENT DOCUMENTS 5,589,275 A * 12/1996 Breitler et al. ............... 428/458
5,911,325 A * 6/1999 Breitler ....................... 206/539

FOREIGN PATENT DOCUMENTS

WO     WO 94/19184     * 9/1994

* cited by examiner

*Primary Examiner*—Ramsey Zacharia
(74) *Attorney, Agent, or Firm*—Bachman & LaPointe, P.C.

(57) ABSTRACT

Process for manufacturing cold formed shaped forms of packaging having at least one recess from a metal-plastic laminate. Examples of such shaped forms of packaging are the base parts of push-through packs or blister packs. The process is such that the laminate is held between a retaining tool and a die. The die 1 exhibits at least one opening and a stamp is driven into the die opening causing the laminate to be shape-formed into a packaging, correspondingly exhibiting one or more recesses.

The die and the retaining tool exhibit facing edge regions and the die, within the edge region, exhibits a shoulder region that surrounds the die opening or openings. The surface of the shoulder region lies 0.01 to 10 mm lower than the surface of the edge region of the die, and a first stamp or first stamps with high friction forming surface form the metal-plastic laminate in one or more steps down to 100% of the final depth of the recess and subsequently a second stamp or stamps with low friction forming surface perform the final forming of the laminate in one or more steps to at least 100% of the final depth of the recess.

8 Claims, 4 Drawing Sheets

PROCESS FOR MANUFACTURING SHAPED FORMS OF PACKAGING

This is a Division, of application Ser. No. 08/755,215, filed Nov. 22, 1996, now U.S. Pat. No. 5,879,612.

BACKGROUND OF THE INVENTION

The present invention relates to a process for manufacturing cold-formed shaped forms of packaging from a metal-plastic laminate in which the laminate is held between a retaining tool and a die exhibiting at least one opening, and a stamp is driven into the die opening causing the laminate to be formed into a shaped form of packaging featuring one or more recesses. The present invention relates also to a device for performing the process of cold forming a metal-plastic laminate into a shaped form of packaging.

It is known to manufacture shaped forms of packaging such as e.g. base parts for blister packs, also known as push-through packs, or other forms of packaging e.g. by deep drawing, stretch-drawing or thermoforming. The shaped packaging may be manufactured from thermoplastics or from composites or laminates such as e.g. aluminum foils and plastic films or extruded layers of thermoplastics.

If the packaging is made of laminates containing metal foils, then shaping tools comprising a stamp, a die and a retaining tool may be employed for its manufacture. As it is being deformed, the laminate is clamped securely between the die and the retaining tool, and the stamp moved towards the laminate. As it is lowered, the stamp moves deeper into the openings in the die thereby deforming the laminate. In that process the flat laminate is converted into a shaped part exhibiting one or more recesses which are surrounded by shoulders corresponding to the original flat plane of the laminate. Only that part of the laminate in the region of the die opening can flow or be stretched to form a shaped part. Adequate lateral distance must be maintained between the stamp and the die opening in order that the laminate, especially laminates containing metal foil, can be deformed without cracks and pores forming. If the laminate contains a metal foil, only recesses of small sidewall height can be achieved by this cold forming process. The result is poor drawing ratios i.e. shallow recesses of large diameter and, therefore, forms of packaging which are too large in relation to the contents.

One possibility for obtaining more laminate for shape-forming purposes may be to reduce the retaining force and to employ deep drawing methods. However, folds would form in the edge or shoulder regions, and so this type of technology may not be used e.g. for making blister packs from laminates containing metal foil. The edge region and, if desired, the shoulder region of shaped forms of packaging are normally employed for sealing on the lid. If there were folds present there, however, then it would not be possible to seal the edge and shoulders.

SUMMARY OF THE INVENTION

The object of the present invention is to describe a process which enables shaped forms of packaging, or shaped parts, to be made from laminates containing metal foil by means of cold forming whereby the forms of shaped packaging so produced are free of folds, and the recesses exhibit large wall height.

That objective is achieved by way of the invention in which a the die and the retaining tool feature a facing edge region and the die, within the edge region, features a shoulder region that surrounds the die opening or openings, and the surface of the shoulder region lies 0.1 to 10 mm lower than the surface of the edge region of the die, and a first stamp or stamps, featuring a high friction, pre-forms the metal-plastic laminate in one or more steps up to 100% of the final depth of the recess, and subsequently a second stamp or stamps, featuring a low friction forming surface forms the pre-formed metal-plastic laminate in one or more steps to at least 100% of the final depth of the recess.

In the present invention the various stamps are advantageously employed one after the other and, in a series of steps down maximum depth via pre-forming, each stamp is lowered into the die opening by the same amount or further than the preceding stamp. As the metal-plastic laminate springs back, at least the last forming step must exceed the full, desired depth of deformation.

In a useful version of the invention the stamp is driven in a first step or steps down to 90%, especially usefully to 70% and advantageously to 50% of the final depth of the recess, and in a second step or steps is driven down to 100–115%, advantageously 103–110% of the final depth of the recess.

Usefully, the stamps or stamping tools, which exhibit a high friction forming surface and are employed in the first step or steps, are cylindrical, blunted cone, blunted pyramid or barrel shaped. The stamps employed for the second step or steps have the shape of a cone, pyramid, blunted cone, blunted pyramid, segment of a sphere or cap. The stamps for the first step feature in particular vertical or steep sidewalls, and the edge or periphery at the bottom of the stamp has a small radius. The lower friction surface stamp for the second step, may be vertical or less steep and in particular exhibit sloping sidewalls, and the transition to the bottom of the stamp may be rounded or roundish in shape. This enables the metal-plastic laminate to slide only poorly over the edge or periphery between the sidewall and bottom of the stamp so that the metal-plastic laminate material from other regions is deformed first, then in a second step or steps, because of the low friction and the rounded shape of the stamp, the metal-plastic laminate material from the bottom region of the stamp is also deformed.

In a second useful version the stamp with a high friction forming surface in contact with the laminate may exhibit higher friction than the stamp with a low friction forming surface.

The process according to the invention be performed e.g. using a die and retaining tool and two or more stamps which are lowered one after the other into the openings in a die then raised again. On their surfaces that effect forming the stamps or stamping tools exhibit different degrees of friction. For pre-forming a first stamp with high friction forming surface is employed; this tool is then withdrawn and a second stamp with low friction forming surface performs the final shape-forming in the same die. Likewise, one may employ three or more stamps with forming surfaces of two different degrees of friction or gradually smaller degrees of friction.

The process may be advantageously performed in such a manner that the stamps are arranged coaxially or telescopically inside each other. A first stamp, featuring in particular a low friction forming surface and ring-shaped in plan view, can effect pre-forming by lowering it into the die. The first stamp may be left in the pre-forming position and a second cylindrical-shaped stamp which slides telescopically in the first ring-shaped stamp and exhibits a high friction forming surface, is then lowered effecting the final forming of the laminate. Such stamping tools may be made up of two or more ring-shaped stamping tools and an innermost cylindrical stamping tool all of which slide telescopically inside each other. The degree of friction of the surfaces effecting forming may decrease gradually from a high degree of friction on the outermost stamping tool to a low degree of friction on the innermost stamping tool, usefully at least in two steps.

The process may also be performed preferably in such a manner that several dies, in particular two dies with their retaining tools, are arranged one after the other and with a stamp appointed to each die. Correspondingly, with two dies and their appointed stamps arranged one after each other, the surface of the first stamp that effects forming may exhibit high friction, the second stamp low friction. Working at a set rhythm the laminate is pre-formed in a first step in the first die, then formed to the final shape in a second step in the second die. It is also possible to perform the pre-forming in two or more steps and to divide the final shaping operation into two or more steps, with the result that the total number of steps in the process used is three, four etc., etc., whereby the friction may be reduced in two steps or gradually in the course of the individual steps.

BRIEF DESCRIPTION OF THE DRAWINGS

FIG. 1 shows in cross-section a device for manufacturing cold-formed blister packs according to the current state of the art;

FIGS. 2 and 3 show schematically in cross-section a device according to the invention in the two sequential steps of the process;

FIG. 4 shows in plan view a die for the device according to the present invention;

FIG. 5 represents a plan view of a retaining tool for the device according to the invention;

FIG. 6 shows schematically a step in the process according to the invention;

FIGS. 7 and 8 show schematically a version of the device according to the invention in the two sequential steps of the process; and FIG. 9 shows a cross-section through a stamping tool.

DETAILED DESCRIPTION OF PREFERRED EMBODIMENTS

Figure 1:
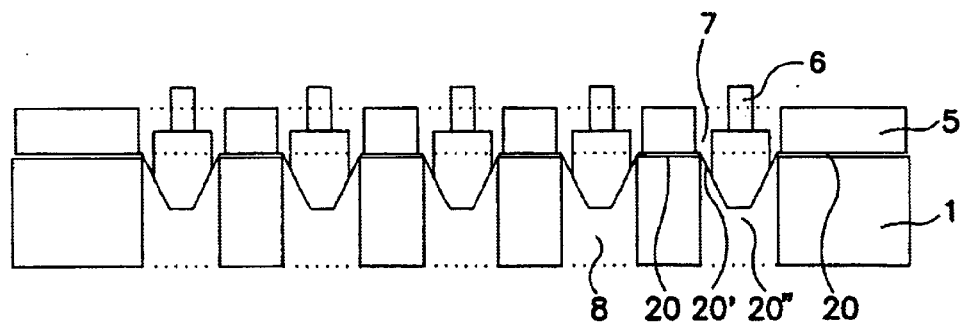
FIGS. 1 to 9 explain the present invention in greater detail by way of example.

The recesses formed out of the area of laminate material may be cup-shaped, dish-shaped, cap-shaped, barrel-shaped, cylindrical etc. As viewed in plan view, the recesses may be round, oval or polygonal, such as two, three, four, or more cornered. Preferred are recesses with steep to vertical sidewalls which are as straight as possible and bases which are domed as little as possible. The recesses are surrounded by a, normally flat, shoulder area of laminate material.

The preferred form of die is such that the surface area of the shoulder region of the die lies 0.1 to 2 mm, preferably 0.15 to 0.3 mm lower than the surface of the edge region of the die.

The device according to the present invention may contain a die with one or more openings.

Usefully, the device, and therefore the die, exhibits 1 to 200 die openings, preferably 8 to 40 die openings. The deformation of the metal-plastic laminate is effected by a stamp, which may as such penetrate a die opening. If the die features several openings, then the stamp may exhibit a support or support plate or holder plate or the like with a corresponding number of stamping tools attached to it. The stamps or stamping tools are dimensioned in such a manner that that they can penetrate the die openings while shape-forming the metal-plastic laminate. Usefully, the diameter of the stamp or the stamping tool is 3 to 35% smaller than the diameter of the related die opening, preferably 1 to 15% smaller and in particular 5 to 10% smaller. By the diameter of the stamp or stamping tool or die opening in the case of a non-circular cross-section, such as a convex cross-section e.g. elliptic, oval, polygonal, rectangular, trapezium or rhomboid shaped etc., is meant the smallest diameter.

As a rule, the walls of the openings in the die stand at an angle of 90° to the surface of the shoulder region. The edges that the wall of the opening and the surface of the shoulder region form with each other may be rounded, with a radius e.g. of 0.1 to 10 mm, usefully 0.1 to 1 mm.

In another preferred version the edge regions of the retaining tool and the die are each from 1 to 100 mm wide, usefully 2 to 30 mm and preferably from 3 to 20 mm.

The die exhibits an edge region and within this edge region the shoulder region. The die openings are arranged in particular symmetrically or also asymmetrically within the shoulder region with the shoulder region forming struts that surround the die openings.

The shoulder region of the die exhibits distances of 1 to 50 mm, preferably 5 to 25 mm between the edge region of the die and the die openings and between the individual openings.

The edge region of the retaining tool or the edge region of the die, or the edge regions of the die and the retaining tool, may exhibit a roughness pattern over part or the whole of the surface there. Typical roughness patterns are corrugations, waffle patterns, embossed patterns, honeycomb patterns, knobs, tooth-like patterns, roughened surfaces etc. Instead of or in addition to the roughness pattern, peripheral strips e.g. of an elastic material such as rubber and the like may be employed. In the working position the edge regions of the retaining tool and the die usefully lie together over the metal-plastic laminate and, if desired with the support of the roughness pattern, hold the laminate in place such that it cannot be stretched. The shoulder region of the die usefully lies a distance from the parts of the retaining tool facing it; in this region the metal-plastic laminate does not make contact with the retaining tool, and the metal-plastic laminate can be stretched or flow according to the degree to which the stamp is lowered.

The shoulder regions of the die may be covered wholly or partly with a layer that, at least on the surface, exhibits a low degree of friction. A low degree of friction here means friction values of 0.2 to 2.1 (dimensionless number), as measured according to method 311A in British Standard 2782. The low friction layer may e.g. contain or be of plastics such as polytetrafluorethylene, polyoxymethylene (polyacetal POM), polyethylene or polyethyleneterephthalate. The low friction layer may also exhibit in mixture form two or more of the plastics mentioned by way of example or one or more of the plastics in mixture form along with hard substances in divided form such as glasses in spherical form. Instead of plastics, other materials may be considered for the low friction layer. This means, for example, metals such as aluminum or chromium steel, especially with polished surfaces. Other low friction layers such as ceramic layers or layers containing graphite, boron nitride or molybdenum disulphide may be employed. The thickness of the low friction layer on the shoulder of the die is not critical as only the surface is of consequence. Under industrial conditions the layer is subjected to large demands with regard to frictional forces and so preference should be given to a thickness that permits some degree of material loss. For that reason the thickness of layer of the above mentioned plastics may be e.g. from 0.5 to 20 mm. The layer of plastic may be inserted in the lowered region of the die as a preform, or it may be deposited by spraying, brushing, wiping or some other method of deposition. The plastics may also be deposited for example in a matrix of other materials such as ceramic or metal using chemical methods or physical methods such as electroplating or electrolytic deposition, plating or vapor deposition in vacuum, or the die may be made, at least in part, of the metals in question.

As a rule, high friction stamps and low friction stamps, both with surfaces effecting forming, comprise a retaining device such as a retainer plate and a number of stamping tools. The number of stamping tools usefully corresponds to the number of die openings. The stamping tools penetrate the openings in the retaining tool and the openings in the die.

In the case of stamp with high friction surfaces effecting forming, at least the surface effecting forming, i.e. the surface of the stamp or the stamping tools coming into contact with the laminate, exhibits a high degree of friction. By a high degree of friction in the present case is meant friction values, according to method 311A, British Standard 2782, of e.g. 1.0 to 3.0 (dimensionless numbers). The high friction surface may contain or be e.g. of metals such as steel, or plastics such as polyacetal (POM), polyethylene, rubber, hard rubber or caoutchouc, including acrylic polymers. Using treatments such as roughening, a metal surface may be endowed with the properties producing high friction behavior.

In the case of stamps with low friction forming surfaces, at least the surface effecting forming, i.e. the surface of the stamp or the stamping tools coming into contact with the laminate, exhibits a low degree of friction. By a low degree of friction in the present case is meant friction values, according to method 311A, British Standard 2782, of e.g. 0.3 or less to 2.1 (dimensionless numbers). The low friction surface may contain or be e.g. of metals such as steel, or plastics such as polytetrafluorethylene, polyoxymethylene (polyacetal, POM), polyethylene, polyethyleneterephthalate. The low friction layer may also exhibit in mixture form two or more of the plastics mentioned by way of example or one or more of the plastics in mixture form and, additionally in divided form, hard substances such as glasses in spherical form. Instead of plastics, other materials may be considered for the low friction layer. This means, for example, metals such as aluminum or chromium steel, especially such with polished surfaces. Other low friction layers such as ceramic layers or layers containing graphite, boron nitride or molybdenum disulphide may be employed.

In using the process according to the present invention the high friction stamp or stamping tools advantageously exhibit a higher friction value or higher friction values than the friction value or values of the low friction stamp.

Metal-plastic laminates that may be used are e.g. laminates containing a metal foil which is 8 to 150 $\mu$m thick, preferably 20 to 80 $\mu$m thick. The foil may be e.g. of steel, iron, copper and preferably aluminum. Included are also metal foils of alloys containing mainly one of the above mentioned metals. Preferred aluminum foils may e.g. be aluminum having a purity of at least 98.0%, usefully 98.3%, advantageously 98.5% and especially 98.6%, the remainder making up the 100% being the accompanying impurities. Further, aluminum foils e.g. of the type AlFeSi or of the AlFeSiMn type may be employed.

The plastics used may be e.g. layers, films or laminates, whereby the films and laminates may also be uniaxially or biaxially stretched, be of thermoplastics of the polyolefin, polyester, polyvinylchloride type and other types.

Typical examples of thermoplastics of the polyolefin type are polyethylenes such as MDPE, HDPE, uniaxially, or biaxially stretched polypropylenes, polypropylenes such as cast polypropylene and uniaxially or biaxially stretched polypropylenes or polyethyleneterephthalate from the polyester series.

The thickness of the thermoplastic, whether as layer, film or laminate in the metal-plastic laminates may be e.g. 12 to 100 $\mu$m, preferably 20 to 60 $\mu$m.

The metal foils and thermoplastics may be converted into a laminate e.g. by adhesive bonding, calandering or extrusion adhesive bonding. To join the layers, adhesives and bonding agents may be applied as required and the surfaces to be joined may be modified by a pre-treatment involving plasma, corona or flame treatment methods.

Examples of metal-plastic laminates are those having a first layer e.g. a film or a film-laminate of the above mentioned thermoplastics, a second layer in the form of a metal foil and, on the free side of the metal foil, a third layer viz., a sealing layer of a polyolefin such as polyethylene or polypropylene or PVC.

Further useable metal-plastic laminates may exhibit a first layer e.g. a film or film-laminate of the above mentioned thermoplastics, a second layer in the form of a metal foil, and a third layer, for example a film or film-laminate or an extruded layer out of one of the above mentioned thermoplastics. Further layers such as sealing layers may be provided.

The metal-plastic laminates may feature a sealing layer in the form of a sealable film or a sealable coating at least on one of the outer lying sides, or on both outer sides. The sealing layer is of necessity the outermost layer in the laminate. In particular the sealing layer may be on one outer side of the laminate, and should be directed towards the contents or shoulder side of the shaped packaging, this in order to enable the lidding foil or the like to be sealed into place.

Typical examples of metal-plastic laminates used in practice are:

oPA 25/Al 45/PVC 60
oPA 25/Al 45/oPA 25
Al 120/PP 50
oPA 25/Al 60/PE 50
oPA 25/Al 60/PP 60
oPA 25/Al 45/PVC 100
oPA 25/Al 60/PVC 60
oPA 25/Al 45/PE coated
oPA 25/Al 45/cPA 25
oPA 25/Al 60/PVC 100 and
oPA 25/Al 60/oPA 25/EAA 50 where oPa stands for oriented polyamide, cPA for cast polyamide, PVC for polyvinylchloride, PE for polyethylene, PP for polypropylene, EAA for ethylene-acrylic acid and Al for aluminum and the numbers the thickness of the layer or foil in $\mu$m.

The present invention relates also to the device for performing the process according to the invention in which the die and the retaining tool exhibit facing edge regions which clamp the laminate between the edge of the die and the edge of the retaining tool such that it cannot stretch, and the stamping tools which draw the laminate over the shoulders of the die into the die openings which lie within a shoulder region in the die, the surface of the shoulder region lying 0.01 to 10 mm lower than the edge region of the die, and the laminate slides or flows as it is drawn or stretched over the surface of the shoulder region.

Useful is a device for performing the process in which the surface of the shoulder region of the die lies 0.1 to 2.0 mm, preferably 0.15 to 0.3 mm lower than the surface of the edge region of the die.

Preferred is a device for performing the process according to the invention in which the shoulder regions of the die are partially or wholly covered with a surface layer exhibiting a low friction value of 0.3 to 2.1.

Preferred is also a device for performing the process according to the invention featuring at least one stamp with a high friction forming surface and at least one stamping tool with a low friction forming surface.

Also preferred is a device for performing the process according to the invention in which the high friction forming surface is of steel, polyacetal (POM), rubber, caoutchouc or acrylic caoutchouc.

Also preferred is a device for performing the process according to the invention in which the low friction forming surface is of steel, polytetrafluorethylene, polyoxymethylene polyethylene or polyethyleneterephthalate.

The present invention relates also to cold formed shaped packaging manufactured by the process according to the invention in which the shaped packaging is a metal-plastic laminate containing oPA 25/Al 45/PVC 60 or oPA 25/Al 45/oPA 25 or Al 120/PP 50 or oPA 25/Al 60/PE 50 or oPA 25/Al 60/PP 60 or oPA 25/Al 45/PVC 100 or oPA 25/Al 60/PVC 60 or oPA 25/Al 45/PE coated or oPA 25/Al 45/cPA 25 or oPA 25/Al 60/PVC 100 or oPA 25/Al 60/oPA 25/EAA 50 where oPa stands for oriented polyamide, cPA for cast polyamide, PVC for polyvinylchloride, PE for polyethylene, PP for polypropylene, EAA for ethylene-acrylic acid and Al for aluminum and the numbers the thickness of the layer or foil in $\mu$m.

Within the scope of the invention is the use of shaped packaging forms which have been cold formed by the process according to the invention, as a container for accommodating individual items in the recesses. Examples of such items are e.g. one, two or three tablets, dragées, pills, ampoules etc. in each recess of a shaped form of packaging such as a blister pack or push-through pack.

The device according to the invention may be employed for manufacturing cold formed shaped packaging forms such as blister packs for pharmaceuticals, foodstuffs and luxury consumables, technical articles, for base and lid parts of semi-rigid and rigid packaging, for enclosing purposes etc. out of metal-plastic laminates.

When thermoforming plastic films such as e.g. PVC into blister packs it is possible to achieve high sidewalls. Up to now it has not been possible to achieve such high sidewalls on the recesses of shaped forms of packaging such as blister packs made from laminates containing metal foils. This meant that the form of packaging that had to be used was much too large in comparison with the contents. It is now possible using the present process to produce shaped forms of packaging that do not exhibit the disadvantages experienced to date i.e. such as the low wall height compared to that achieved with thermoformed plastic films. With the present process it is now possible to manufacture shaped forms of packaging which with respect to size of packaging, are at least comparable, if not better compared e.g. with plastic blisters. The packaging can therefore be designed to look more attractive and to have a better image from the ecological standpoint.

A drawing ratio, i.e. a ratio of diameter to the height of the recess formed, of e.g. 2 to 3 may be achieved. The diameter of the recess, if not round in cross-section, is to be understood as the smallest diameter i.e. in the case of non-circular cross-sections, such as a convex cross-section e.g. elliptical, oval, polygonal, rectangular, trapezium shaped, rhomboid etc.

The largest diameter of individual recesses may be e.g. 1 to 500 mm, preferably 3 to 30 mm, and the height of a recess from 1 to 100 mm, preferably 3 to 30 mm.

The number of recesses in the base part is not critical and may e.g. be one, two or more. In pharmaceutical applications packs with 6 to 40 recesses are normal.

By cold forming is meant here forming at temperatures of e.g. 10 to 35° C., preferably 20 to 30° C.

The laminates that are processed into shaped forms of packaging such as blister packs and in particular base parts of blister packs remain pore-free even at high drawing ratios, and the reject rate due to forming is substantially reduced.

Seen in FIG. 1 is a state-of-the-art device comprising a die 1 a retaining tool 5 and a stamp 6. In the present case the stamp features a support (not shown) and mounted thereon a number of stamping tools 6. The number of stamping tools corresponds to the number of openings in the die 1. The stamps or the stamping tools 6 penetrate the opening 7 in the retaining tool. A metal-plastic laminate 20 is placed between the die 1 and the retaining tool 5. By applying force, the retaining tool 5 is pressed against the die 1, as a result of which the metal-plastic laminate 20 is held securely at all places of contact between the die 1 and the retaining tool 5, essentially unable to be stretched. The stamping tools 6 are lowered under the application of force and enter the openings 7 in the retaining tool, press against the metal-plastic laminate 20 and, while deforming the metal-plastic laminate 20, pass through the die openings 8 in the die, until the desired degree of deformation of the metal-plastic laminate has been achieved.

The metal-plastic laminate is held both in the edge region and in the shoulder region 13 between the retaining tool 5 and the die 1, essentially unable to be stretched, and the deformation of the laminate effected solely within the metal-plastic laminate material covering the die opening 8.

Figure 2:
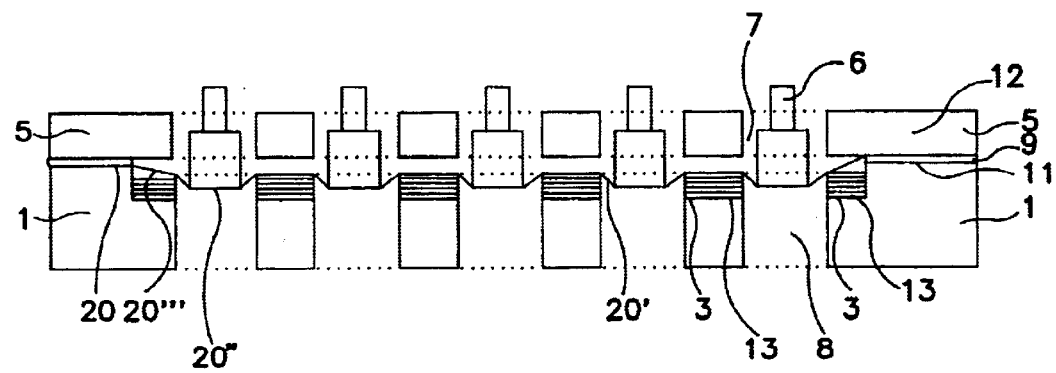
Figure 3:
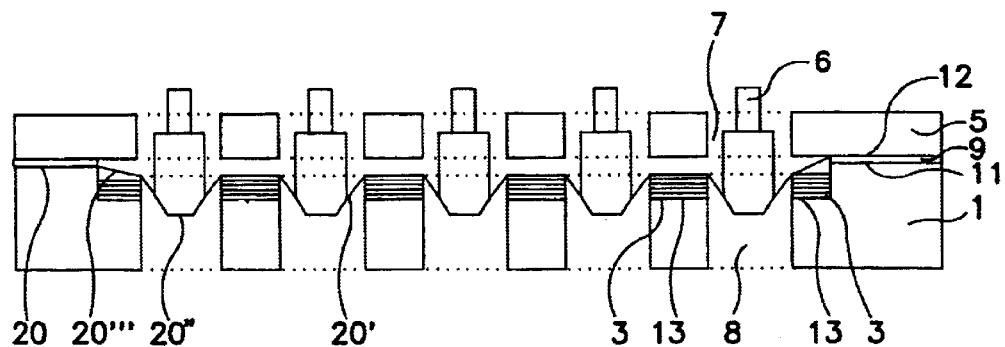

In FIGS. 2 and 3 the process according to the invention is shown in two stages; the device, illustrated here in cross-section, shows the die 1, the retaining tool 5 and the stamps (stamping tools) 6. The retaining tool 5 features an edge region 12; also the die 1 features an edge region 11. A roughness pattern 9 is provided in the edge region 11 of the die. The whole shoulder region 13 i.e. the region of the die 1 that is located within the die region 11 and forms the shoulders that surround the die openings, is lower than the edge region 11 of the die 1.

A layer 3 is provided in the shoulder region 13 of the die 1, and is shown shaded in FIGS. 2 and 3. Layer 3 is a layer of a low friction material such as e.g. polytetrafluorethylene, polyoxymethylene, polyolefins or polyethyleneterephthalate etc. Advantageously, layer 3 extends over the whole shoulder region 13 of the die 1. A layer 3 which only covers part of the shoulder region 13 is possible in some cases.

Lowering the shoulder region 13 of the die 1 may be achieved by a chip-forming process such as milling, grinding or spark erosion etc. The die 1 may also be in two parts such that the edge region 11 and the shoulder region 13 can be moved and adjusted with respect to each other and, on reaching the desired difference in height, may be secured in place with respect to each other. The die 1 may also be a casting that already exhibits the lower height in the shoulder region 13. Likewise, it is also conceivable for the retaining tool 5 not to exhibit a flat surface facing the die 1, but an edge region 12 and a shoulder region that is lower than the edge region 12.

The metal-plastic laminate 20 is shape-formed in the device according to the invention. The metal-plastic laminate 20 may be introduced into the device in the form of an endless strip from a supply roll or in sheet form. The different parts of the metal-plastic laminate that undergo different degrees of deformation are indicated by 20' 20" and 20'". The metal-plastic laminate 20 is positioned, clamped between the retaining tool 5 and the die 1 and, especially in region 11 of the die 1 which is covered by the edge region of the retaining tool 5, is unable to be stretched. The stamping tools are lowered under the application of force through the openings 7 in the retaining tool, and press against the metal-plastic laminate 20". While deforming the metal-plastic laminate, the stamping tools 6 are lowered through the openings 8 in the die until the desired degree of deformation of the metal-plastic laminate has been reached. The metal-plastic laminate 20'" in the whole of the shoulder region 13 i.e. along the edge regions and the shoulders between the die openings 8, is able to flow and is deformed by stretching according to the extent to which the stamp 6 is lowered into the die openings 8. In addition, the metal-plastic laminate 20" between the shoulder region and the stamping tool 6 is deformed by stretching. The stamping tools 6 have a surface exhibiting a high degree of friction and are to advantage cylindrical or barrel shaped. This means that the periphery or edges between the base and sidewall of the stamping tool are of small radius and the sidewall of the stamp form a steep angle or is vertical to the base of the stamp. The deformation is performed until e.g. 100% of the final depth of the recess has been reached.

The second stage in the process according to the invention is shown in FIG. 3. There is no essential difference with respect to the die 1, retaining tool 5, openings 7 and 8, the roughness pattern 9, the edge region 11, the edge region 12 and the shoulder region 13 as far as the device is concerned. In the second stage of the process other stamping tools 6 are lowered into the die openings 8 thus deforming the metal-plastic laminate 20 further until the desired degree of deformation of the laminate has been achieved. The metal-plastic laminate 20'" can flow and be stretched further in the whole of the shoulder region 13 i.e. along the edge regions and the shoulders between the die openings 8 and to an extent according to the amount to which the stamping tools 6 are lowered into the die openings 8. Also the metal-plastic laminate 20' between the shoulder region and the stamping tool body 6 is stretch-formed further. A stamping tool with e.g. a body 6 of blunted cone cross-section is employed for the second stage of the process. The surface of the stamping tool body 6 effecting forming exhibits low friction. Consequently, the metal-plastic laminate 20" in the region of the surface of the stamping tool effecting forming is also able to flow. The forming operation is performed e.g. at least until the final depth of the recess has been reached i.e. at least to 100% of the required depth.

Figure 4:
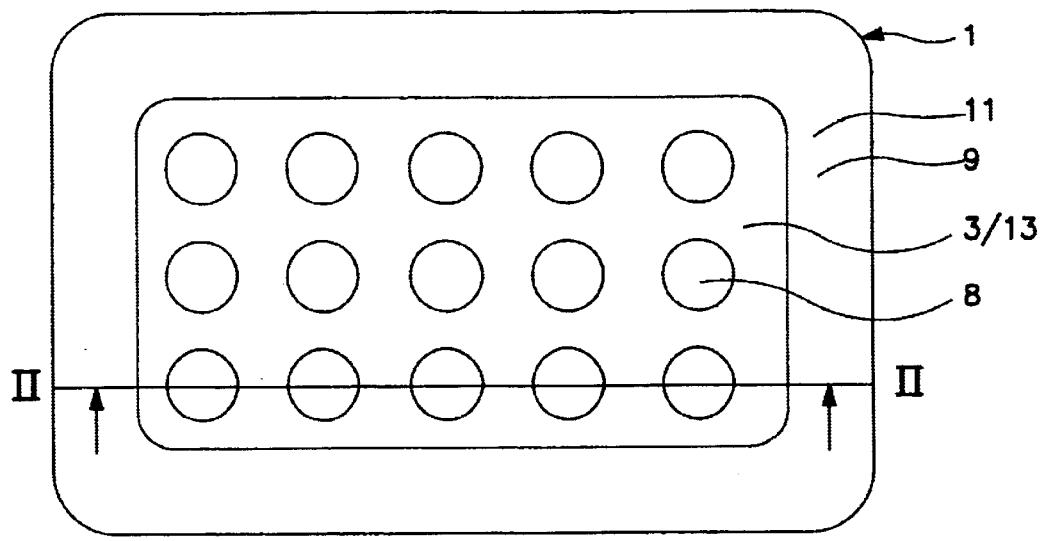

FIG. 4, a plan view of a die 1, shows the edge region 11 and the shoulder region 13. The edge region 11 may feature a roughness pattern 9. The shoulder region 13 lies 0.01 to 10 mm lower than the edge region 11. In an advantageous version the shoulder region 13, is partly and especially fully covered with the described low friction deposit or layer 3. The die openings 8 are shown by way of example in a regular array in the shoulder region 13. As a rule these are holes i.e. openings or recesses that are round in cross-section or openings that are oval in cross-section. Also openings that are polygonal in cross-section e.g. rectangular, square or six sided may be created without any difficulty.

Figure 5:
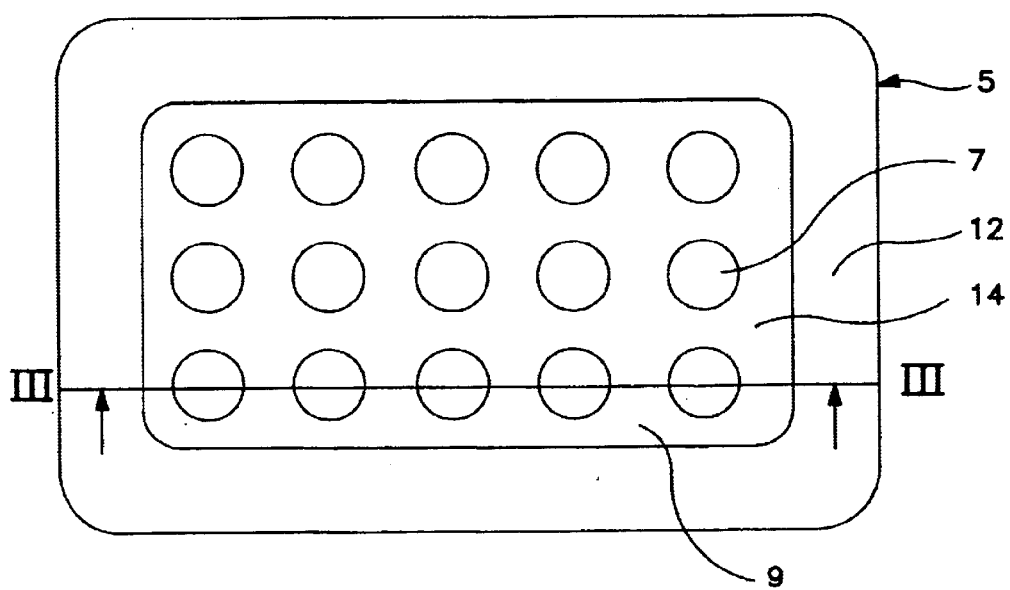

A retaining tool 5 is shown in plan view in FIG. 5. The surface 14 of the retaining tool 5 which faces the die and comes to rest on the laminate during manufacture may be flat. In the production stage the laminate is securely clamped across the areas of contact with the edge region 12 of the retaining tool 5 and the edge region 11 of the die 1, and viz., such that the laminate can not stretch or flow there. Instead of a flat surface the retaining tool 5 may also feature an edge region 12 and lower region within the edge region, or the retaining tool 5 may essentially comprise only of the edge region i.e. a ring. A roughness pattern may be provided over part or the whole of the surface in the edge region 12 of the retaining tool 5. The edge region of the retaining tool 5 is usefully positioned and essentially of the same dimension as the edge region 11 of the die 1.

The retaining tool 5 exhibits a plurality of openings 7 or recesses, in the present case openings. The openings 7 are penetrated by the stamps or stamping tools and, accordingly, the holes are arranged in the same manner and at least approximately the same size as the openings 8 in the die 1.

The lines II—II in FIG. 4 and III—III in FIG. 5 are the lines of cross-section through the die 1 and retaining tool 5 shown in FIGS. 2 and 3.

Figure 6:
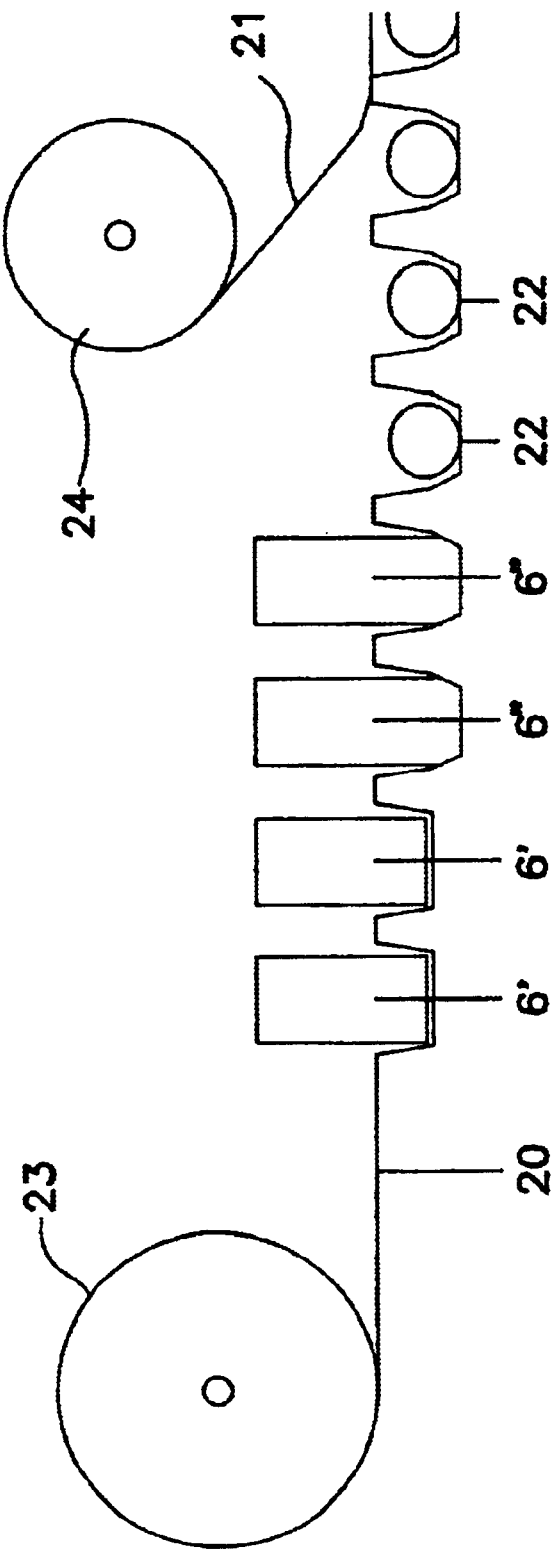

The process according to the present invention is shown simplified and schematically in FIG. 6. A metal-plastic laminate 20 is uncoiled from a roll 23 and fed to a first stamp with body 6' then to a second stamp with body 6". Recesses are thereby pressed into the metal-plastic laminate 20 in two stages. The result is a shaped form of packaging to which the contents 22 are then added. Thereafter, a lidding foil 21 may be continuously uncoiled from a roll 24 and sealed or the like onto the shaped packaging. The endless packaging strips can then be cut to the desired pack sizes.

Figure 7:
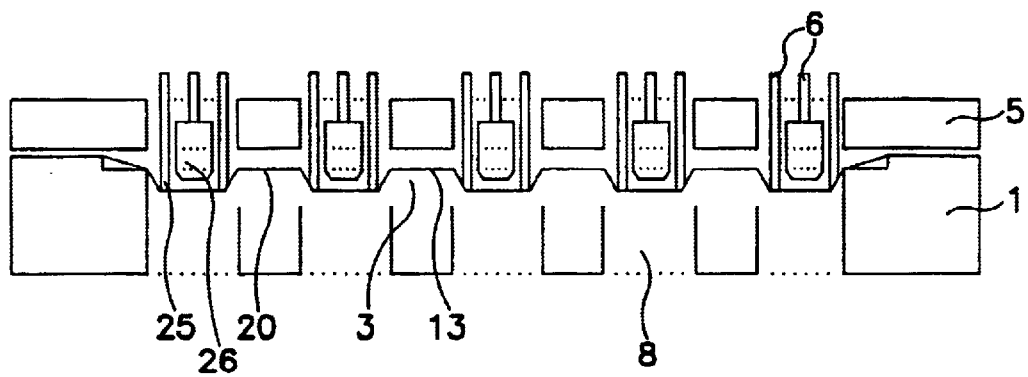
Figure 8:
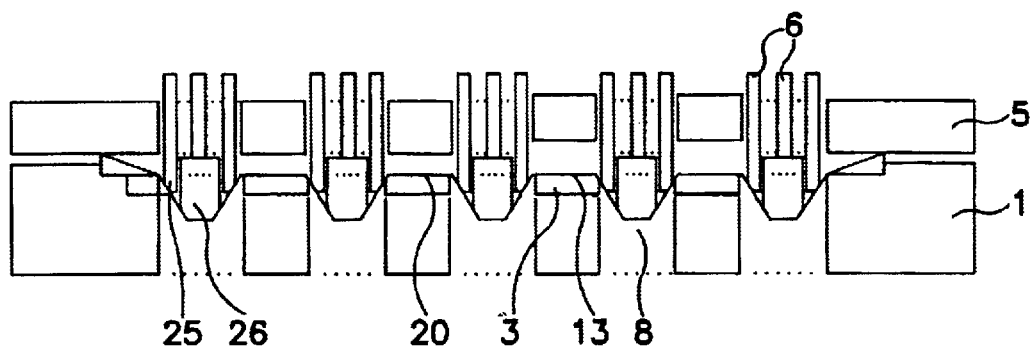

Shown in FIGS. 7 and 8 is a further version of the process according to the invention taking place in two stages, the device, illustrated in cross-section, showing the die 1, the retaining tool 5 and the stamp 6. Further details and their notation being as shown in FIGS. 2 and 3. A layer 3 is provided in the shoulder region 13 of the die 1. The layer 3 is shown shaded and is the layer of low friction material, known from FIGS. 2 and 3. FIG. 7 shows the first step in the process. The metal-plastic laminate 20 is being shape-formed by the stamps 6 which make up a unit and are in e.g. two parts. A hollow, cylindrical stamp 25, which in plan view is ring-shaped and has a high friction forming surface, is lowered and pre-forms the metal-plastic laminate 20. As shown in FIG. 8, the final shape-forming of the metal-plastic laminate 20 takes place in the second stage. A cylindrical stamp 26 slides telescopically inside stamp 25 which in FIG. 7 has reached its lower end position where it remains. The stamp 26 slides telescopically out of stamp 25 and is lowered beyond stamp 25. As a result, the stamp 26 with its low friction forming surface deforms the metal-plastic laminate 20 advantageously up to and beyond the desired 100% depth of formation.

Figure 9:
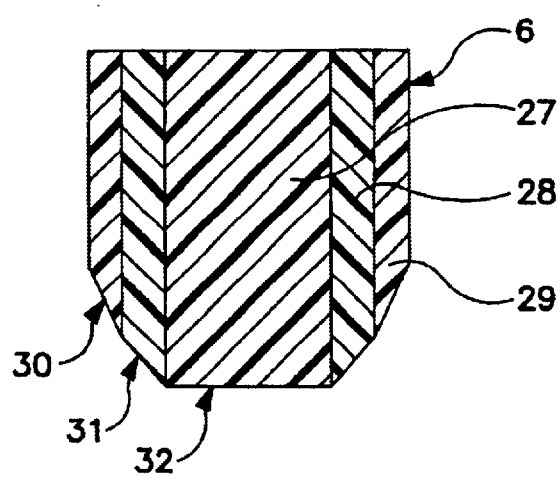

FIG. 9 shows a single piece stamp 6 made up of materials 27, 28, 29 with different coefficients of friction. Accordingly, shape-forming surface 30 of the stamp 6 exhibits higher coefficient of friction than shape-forming surface 31 and, in turn, shape-forming surface 32 exhibits a lower coefficient of friction than surface 31.

In the present example a relatively small die is shown. It is also possible to design dies according to the present invention with the shoulder region subdivided by transverse and/or longitudinal struts. The metal-plastic laminate is held, clamped securely in place, in the region of these struts. This enables a plurality of shaped packaging to be produced e.g. with one die and one stroke of the stamp. After the shaping process, the shaped packs that are produced simultaneously may be separated e.g. at dividing lines along the struts.

What is claimed is:

1. Cold-formed shaped packaging which comprises a shaped packaging made of a metal-plastic laminate with at least one packaging recess therein, said at least one recess having a diameter and a height wherein a ratio of diameter to height of said at least one recess is 2–3, and a substantially flat foil lidding sealed onto the shaped packaging wherein said shaped packaging is free of folds.

2. Cold formed shaped packaging according to claim 1, characterized in that the shaped packaging is made of a metal-plastic laminate containing in its make up oPA 25/Al 45/PVC 60 or oPA 25/Al 120/PP 50 or oPA 25/Al 60/PE 50 or oPA 25/Al 60/PP 60 or oPA 25/Al 45/PVC 100 or oPA 25/Al 60/PVC 60 or oPA 25/Al 45/PE coated or oPA 25/Al 45/cPA 25 or oPA 25/Al 60/PVC 100 or oPA 25/Al 60/oPA 25/EAA50 where oPA stands for oriented polyamide, cPA stands for cast polyamide, PVC stands for polyvinylchloride, PE stands for polyethylene, PP stands for polypropylene, EAA stands for ethylene-acrylic acid copolymer and Al stands for aluminum and the numbers for the thickness of the layer or foil in $\mu$m.

3. Cold formed shaped packaging according to claim 1, including a plurality of said recesses spaced from each other.

4. Cold formed shaped packaging according to claim 3, wherein said recesses have a diameter of 1–500 mm.

5. Cold formed shaped packaging according to claim 3, including 6–40 of said recesses.

6. Cold formed shaped packaging according to claim 1, wherein said metal-plastic laminate has a metal layer of 8–150 microns.

7. Cold formed shaped packaging according to claim 6, wherein the plastic layer has a thickness of 12–120 microns.

8. Cold formed shaped packaging according to claim 1, wherein said metal-plastic laminate has a central metal layer and plastic layers on either side thereof.

* * * * *